PROCESS FOR PRODUCING A PLATED WIRE MEMORY

Filed July 14, 1969 3 Sheets-Sheet 1

INVENTORS
HOWARD C. GORMAN
JOSEPH M. SHAHEEN
BY MELVIN J. Van ZANTEN
DARL F. BOWMAN
GERALD J. MOSER
JOHN SIMONE
Robert G. Rogers
ATTORNEY

PROCESS FOR PRODUCING A PLATED WIRE MEMORY

Filed July 14, 1969 3 Sheets-Sheet 2

INVENTORS
HOWARD C. GORMAN
JOSEPH M. SHAHEEN
MELVIN J. Van ZANTEN
DARL F. BOWMAN
GERALD J. MOSER
JOHN SIMONE
BY Robert G. Rogers
ATTORNEY INVENTORS
HOWARD C. GORMAN
JOSEPH M. SHAHEEN
MELVIN J. Van ZANTEN
DARL F. BOWMAN
GERALD J. MOSER
JOHN SIMONE
BY
Robert G. Rogers
ATTORNEY United States Patent Office 3,553,648
Patented Jan. 5, 1971

3,553,648

PROCESS FOR PRODUCING A PLATED WIRE MEMORY

Howard C. Gorman, Tustin, John Simone, Garden Grove, Joseph M. Shaheen, La Habra, Melvin J. Van Zanten, Garden Grove, and Darl F. Bowman and Gerald J. Moser, Yorba Linda, Calif., assignors to North American Rockwell Corporation Filed July 14, 1969, Ser. No. 841,632
Int. Cl. G11c 5/12, 11/14, 7/02
U.S. Cl. 340—174 1 Claim

ABSTRACT OF THE DISCLOSURE

The process of producing a plated wire memory includes etching wordstraps and overhanging keepers which are placed in intimate contact for controlling the density of bits of information represented by the plated wires of the memory. The process also includes producing interstitial connections from unremoved dummy wires located between plated memory wires to conductive pads.

BACKGROUND OF THE INVENTION

(1) Field of the invention

The invention relates to a plated wire memory and, more particularly, to such a memory having interstitial wires and overhang keepers which are in intimate contact with the wordstraps controlling the magnetic field in the plated memory wires.

(2) Description of prior art

Existing plated wire memories use keepers which are either separated from the wordstrap by, for example, an epoxy layer, or which are not separated and without an overhang. The magnetic flux around a wordstrap, due to a current pulse, spreads along the plated wire and interferes with adjacent stored bits of information. As a result, the bit density is reduced.

By using an overhanging keeper which is in intimate contact with the wordstrap, as described herein, the magnetic field is confined and a more uniform density is maintained along the wire. By minimizing the flux spreading, the degree of isolation of storage bits is improved and the density of the bits along a plated wire is increased. In addition, since the flux does not have to penetrate the wordstrap when an overhang keeper is employed, the magnetic field resulting from a word current responds more swiftly on the current's rising and falling edges leading to faster cycle times.

Typical plated wire memories are designed such that the wires between the wordstraps are exclusively bit-oriented. That is, their function is to provide the sense and dummy lines as required for the storage and reading of information. Such memory orientations are susceptible to noise having a magnitude related to the stored information on adjacent plated wires. The noise is increased as the proximity of the adjacent wires increases. Further, there are some applications where short write cycles are required, and the return of bit drive current through a memory wire may prohibit short cycles because of the slow bit line (wire) recovery.

By using interstitially located wires between the bit wires, more shielding and faster write times can be achieved. The interstitial wires must be properly connected to each other and be in the bit current driver's return current path. These wires also provide the ground (electrical) plane for the wordstraps and bit lines to control the impedance of the system.

SUMMARY OF INVENTION

Briefly, the invention comprises a plated wire memory in which the magnetic field in a plated bit wire is relatively confined to a particular bit area by an overhanging keeper in intimate contact with a wordstrap. The memory also contains interstitially located wires between the normal bit wires to enhance the signal/noise ratio and improve write cycle times in a high bit density memory.

Therefore, it is an object of this invention to provide a plated wire memory having increased bit density.

It is still another object of this invention to provide interstitially located wires between each of the plated bit wires of the memory for improving the time response of the memory and for improving the shielding of the bit wires.

A still further object of the invention is to provide a plated wire memory having a unique wordstrap and keeper combination for minimizing flux spreading along a plated memory wire.

Still a further object of this invention is to provide a process for producing an improved plated wire memory.

A still further object of the invention is to provide a process for producing a plated wire memory using etching techniques for producing overhanging keepers in contact with wordstraps and for producing electrical connection points to said wordstraps and between portions of said wordstraps.

Still a further object is to provide a process which incorporates and properly terminates interstitial wires so that higher density plated wire memories may be realized.

These and other objects of the invention will become more apparent during the description of the drawings, a brief description of which follows:

DESCRIPTION OF PREFERRED EMBODIMENT

Figure 1:
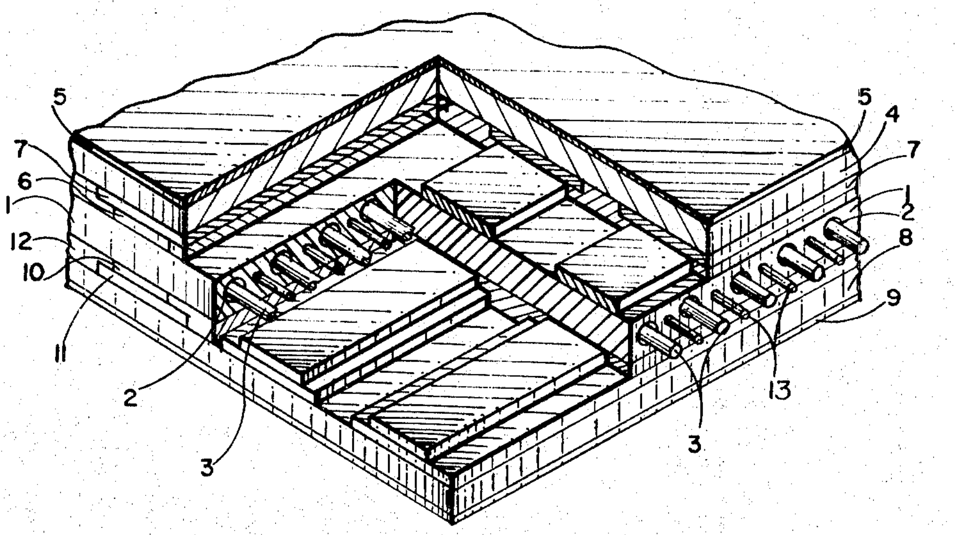
FIG. 1 is a perspective and cutaway view of a partially completed plated wire memory.

FIG. 1 illustrates layer 1 through which parallel disposed tunnels, represented generally by numeral 2, have been formed. The tunnels are formed by molding around core wires represented by numeral 3. Also, the structure is holded around the interstitial wires represented by numeral 13, which are malleable, solderable and of high conductivity. During the process for producing them memory plane, shown in more detail in FIG. 1, the wires 3 are replaced by plated wires. Ordinarily, layer 1, for example, a Teflon material, is formed so that the wires are centrally located through the layer in a pre-arranged array.

Layer 4, with copper layer 5 on one surface and plurality of wordstraps 6 with keepers 7 on the other surface, is disposed on one surface of layer 1. Layer 8, with copper layer 9 on one surface and plurality of wordstraps 10 with keepers 11 on the other surface, is disposed on the opposite surface of layer 1. The space between the keepers and wordstraps is filled with an epoxy material 12 and cured to level the wordstrap surface so that the pressure applied to layer 1 during a subsequent laminating process is equally distributed. A low laminating pressure is preferred to prevent changes in the magnetic characteristics of the keeper.

The wordstraps and keepers may be produced by depositing a copper layer over a nickel/iron layer affixed to one side of an epoxy glass board. Afterwards, the copper surface is masked to etch through both the copper and the nickel/iron layers. The copper surface is again masked and selectively etched to produce wordstraps which are narrower than the nickel/iron etched widths. As a result, overhanging keepers with wordstraps in intimate contact are formed.

Figure 3:
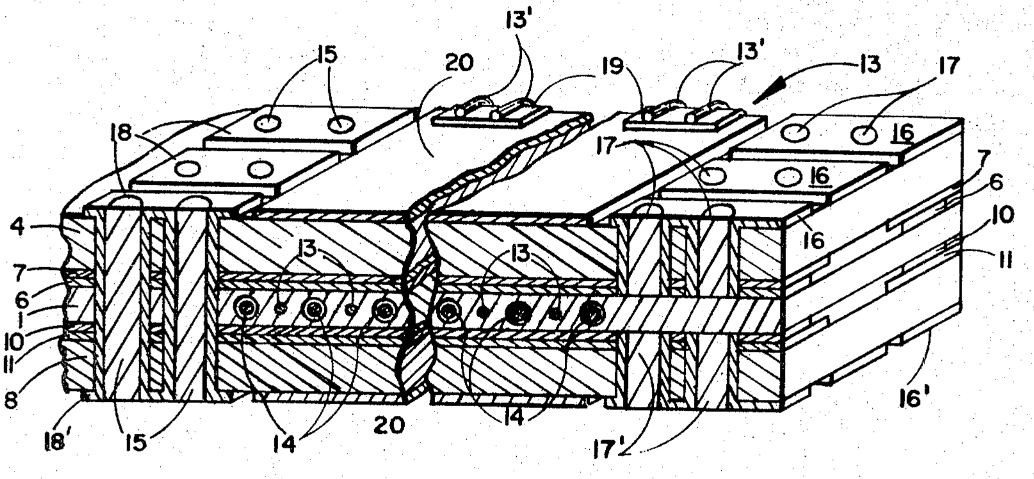
FIG. 3 is a perspective view of a completed plated wire memory without peripheral circuitry.
Figure 2:
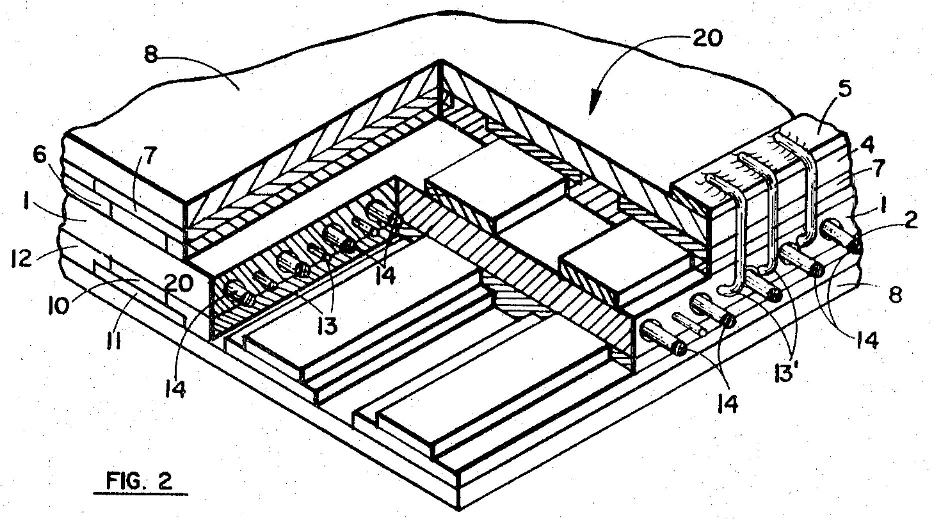
FIG. 2 is a perspective and cutaway view of a completed plated wire memory without peripheral circuitry.

FIGS. 2 and 3 show the memory plane 20 after the producing process has been substantially completed. Plated holes 17 and 17' are formed through layers 4 and 8 respectively and through the keeper and wordstrap layers to electrically connect the wordstraps on both sides of layer 1 to the connection pads 16 and 16' on the outer surfaces of layers 4 and 8 respectively. Plated holes 15 are produced through all the layers of the memory plane 20 at the opposite edge to electrically connect the wordstraps 6 and 10. Pads 19, 18, 18', 16 and 16' on the outer surface of layers 4 and 8 are produced by masking and etching layers 4 and 8 after the hole forming, plating and resin filling process.

The holes are formed at the edges of the memory plane 12 over an extended part of tunnel layer 1, which does not include core wires. Tunnels are omitted in the extended area since the holes 15 must pass completely through the board. Tunnels are also omitted in the other extended part under holes 17 and 17' since a portion of the keepers and wordstraps has been removed. The magnetic field in that area would be badly distorted and serve no practical use.

Redundant holes are formed at both extremities of the memory plane to improve the reliability of the electrical connections. If one hole does not provide the necessary electrical connection, the additional hole could. In other embodiments, however, the redundant plated holes could be eliminated.

The plated holes may be formed through the layers by conventional drilling, plating, resin filling and etching techniques. In the preferred process, the holes are drilled and plated before the core wires 3 are removed and replaced by plated wires 14. During the forming process, the tunnel structure is sealed, for example, by a pressure sensitive sealing film to prevent contamination of the tunnels. The holes 15, 17 and 17' are filled with a resin material after plating to prevent erosion by etchants from occurring in the holes during the masking and etching process. The erosion could otherwise interfere with the electrical connections to the wordstraps.

Before the core wires 3 have been replaced by plated wires 14, the interstitial wires 13' are connected to the bus bars 5 by conventional soldering techniques completing the conductor matrices required in forming the memory plane 20. The connection could be made afterwards, however.

Figure 4:
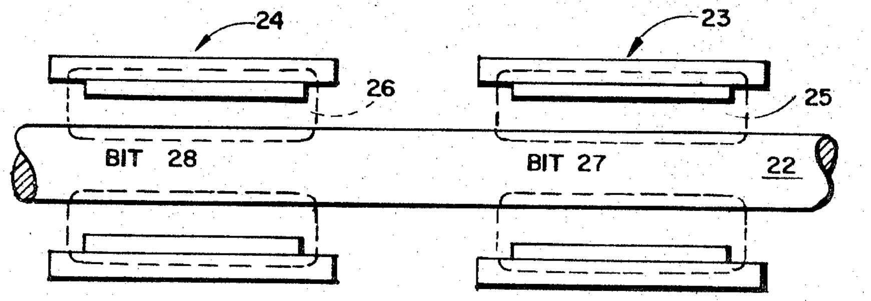
FIG. 4 is a schematic illustration of the keeper-wordstrap combination about a plated wire which shows the control of the flux density in the wire.

FIG. 4 shows a schematic illustration of plated wire 22 encircled by wordstrap and keeper combinations 23 and 24. Typical flux lines produced by a current pulse in the wordstraps are represented by dotted lines 25 and 26. For purposes of the illustration, the first bit position is labeled as bit position 27 and the adjacent bit position as bit 27 along the plated wire bit line 28. The low reluctance magnetic path along the wordstrap results from the use of the high permeability nickel/iron keeper. The keeper keeps the magnetic flux path close to the copper wordstrap. The flux lines pass from keeper overhang to the plated wire without having to penetrate the copper wordstrap which allows the field to respond more swiftly on the rising and falling edges of the word current pulse. As a result, the keeper overhang controls the spreading and configuration of the magnetic field. Since the flux spreading is minimized, the edgree of isolation between storage bits is increased so that bit density along the wire can also be incerased.

Figure 5:
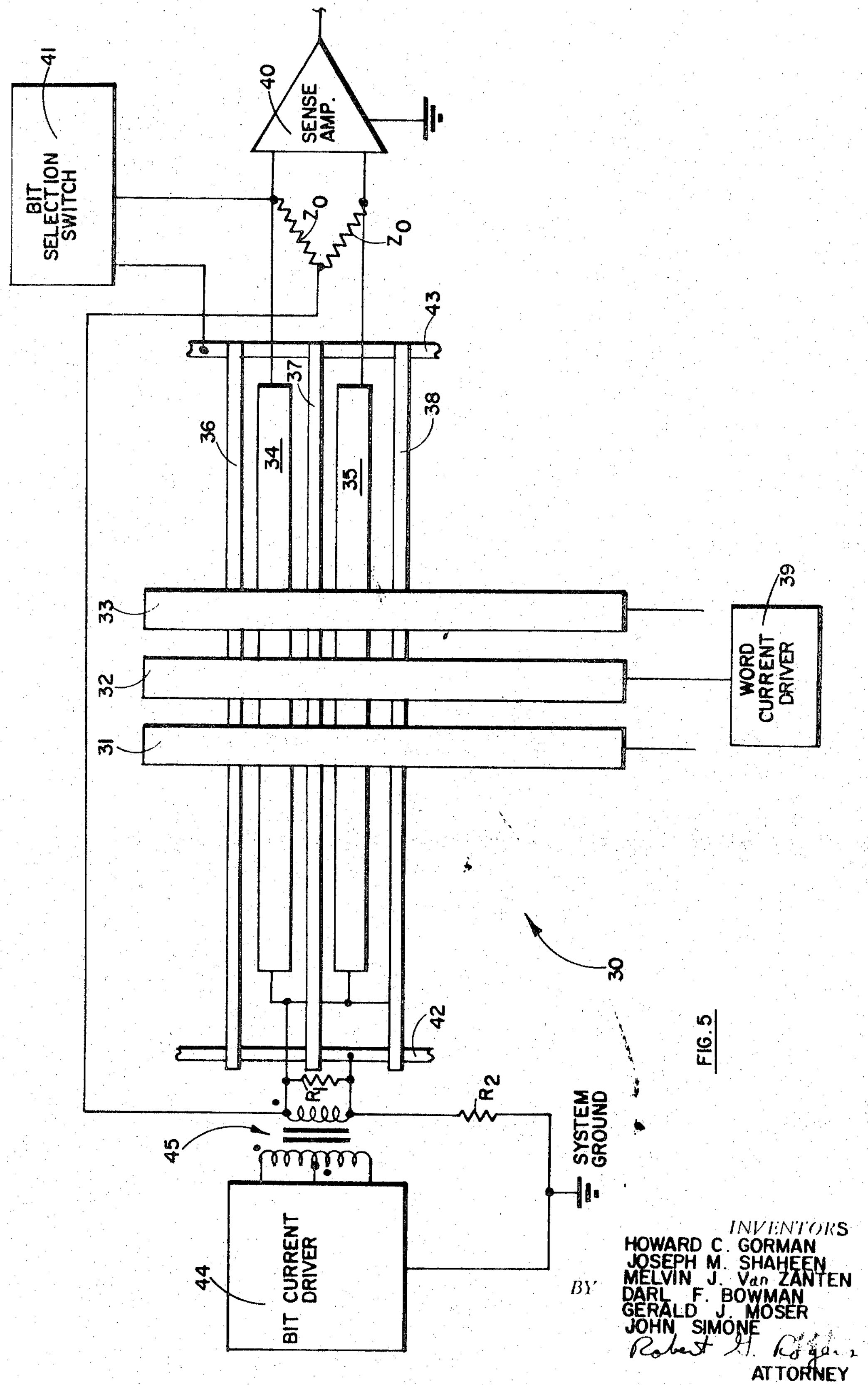
FIG. 5 is a schematic illustration of a plated wire memory including peripheral circuitry.

FIG. 5 is a schematic illustration of a portion of a plated wire memory system 30 which includes certain peripheral systems. The circuit is used to describe the operation of the memory plane shown in FIGS. 1–3. In an actual embodiment, the number of bit lines would be determined by a particular memory configuration. Similarly, the number of wordstraps and keepers would be determined by the word capacity of the memory. Three wordstraps 31, 32 and 33, are illustrated. Overhanging keepers have been omitted for convenience. Line 34 is used to represent a bit of the memory plane, and line 35 represents a dummy wire. Lines, 36, 37 and 38 represent interstitial wires connected to bus lines 42 and 43. The bus lines represent the pad connections 19, shown in FIG. 3. One bus line 42 is connected through resistor R2 to electrical ground. The other bus line 43 is connected to the bit selector switch 41 to provide a return current path for the bit lines.

A minimal number of wordstraps, bit lines and peripheral circuitry is shown for convenience in describing memory operations. Information is written into a given memory bit location by passing a current from word current driver 39 down a selected wordstrap, for example, 32 in coincidence with a bit current from bit current driver 44 down a corresponding plated wire, for example, 34. The typical bit selector switch 41 is used to select a particular bit line during a writing operation. The polarity of the bit current determines whether a "one" or "zero" is written at the wordstrap bit line crossover.

Readout of the stored information occurs during the leading or falling edge of current passed down the wordstrap. The dummy wire 35 is used for common mode noise cancellation at the input to differential sense amplifier 40. Bit line 34 and dummy line 35 are terminated in their characteristic imepdances, $Z_0$, at the sense amplifier 40 to control line reflections or ringing. The common connection between the impedances is connected to transformer 45 as a center tap reference for the sense line termination. Transformer 45 isolates current drive 44 from the rest of the system and provides the required bipolar drive.

Use of the overhanging keepers (as shown in FIG. 4) on the word lines minimizes the spreading of the stored bit under, for example, wordstrap 31 from disturbing the state of the stored bit under wordstrap 32. The same is true of the adjacent bit under wordstrap 33.

Use of the interstital wires minimizes the tendency of the illustrated bit to pick up noise related to signals on adjacent bits. Also, the word line and bit line impedances are controlled by the interstitial wires. The interstitial wires provide a minimal inductance return path for the bit drive current as shown and, thereby, reduces the bit line recovery time after writing.

In a practical memory system, the number of word and bit lines with their corresponding drive and sensing electronics would be extended to a required number. Drive electronics and sensing electronics matrices would be formed to minimize circuitry in accord with memory speed and size requirements.

We claim:

1. A process for producing a plated wire memory comprising the steps of, producing an insulating tunnel layer with parallel disposed tunnels filled with dummy wires, said tunnel layer having portions at the extremities thereof which does not include tunnels, first etching a pattern of wordstraps from a first conducting metal layer, second etching a first pattern of keepers from a second conducting metal layer in contact with said first conducting metal layer and on a first insulating layer, third etching a pattern of wordstraps from a third conducting metal layer, fourth etching a second pattern of keepers from a fourth conducting metal layer in contact with said third conducting metal layer and on a second insulating layer, in said first and third etching steps, said second and fourth conducting metal layers providing backing etching masks for said first and third conducting metal layers, said first and second patterns of keepers having overhanging portions for confining the flux field generated by a signal passing through said wordstraps to a certain area of the plated memory wires, said first and second, and said third and fourth conducting layers each comprising different conducting metals, laminating said first etched wordstraps, keepers and first insulating layer combination to one surface of said insulating tunnel layer, said wordstraps and keepers being disposed at right angles to said tunnels, and simultaneously, therewith, laminating said second wordstraps, keepers and second insulating layer combination to the other surface of said insulating tunnel layer, said wordstraps and keepers being at right angles to said tunnels, with the corresponding wordstraps and keepers on each surface of said tunnel layer being approximately aligned, producing termination pads on both surfaces of said first and second insulating layers at the extremities thereof over the portions of said tunnel layer which do not include tunnels, producing plated through-hole connections from the termination pads at one extremity of said plated wire memory to the wordstraps on both sides of said tunnel layer, and producing plated through-hole connections from the termination pads at the other extremity of said plated wire memory for electrically interconnecting the wordstraps on both sides of said tunnel layer for completing an electrical path around said tunnels, removing certain of said dummy wires and inserting plated memory wires in said tunnels, producing interstitial connections from the unremoved dummy wires to pads on at least one surface of said memory for improving the performance of said plated wire memory.

References Cited

UNITED STATES PATENTS

| | | | |
|---|---|---|---|
| 3,221,312 | 11/1965 | MacLachlan | 340—174 |
| 3,381,281 | 4/1968 | Doughty et al. | 340—174 |
| 3,440,719 | 4/1969 | Meier | 29—604 |
| 3,487,385 | 12/1969 | Sakai | 340—174 |

OTHER REFERENCES

IBM Technical Disclosure Bulletin, "Keeper Structures For Coupled Film Memories" by Chang et al., Vol. 9, No. 1, June 1966, pp. 69–70.

IBM Technical Disclosure Bulletin, "Flat Film Memory," by Stopper, Jr., vol. 6, No. 2, July 1963, pp. 71–72.

STANLEY M. URYNOWICZ, Jr., Primary Examiner

U.S. Cl. X.R.

340—174